G. WESTINGHOUSE, Jr.
ATMOSPHERIC CAR BRAKE PIPE.

No. 109,695.           Patented Nov. 29, 1870.

Witnesses:
R. C. Wrenshall
Theo. P. Kerr

Inventor:
George Westinghouse jr
by his attorneys
Bakewell & Christy.

UNITED STATES PATENT OFFICE.

GEORGE WESTINGHOUSE, JR., OF PITTSBURG, PENNSYLVANIA.

IMPROVEMENT IN ATMOSPHERIC CAR-BRAKE PIPES.

Specification forming part of Letters Patent No. 109,695, dated November 29, 1870.

*To all whom it may concern:*

Be it known that I, GEORGE WESTINGHOUSE, Jr., of the city of Pittsburg, in the county of Allegheny and State of Pennsylvania, have invented a new and useful Improvement in Couplings for Atmospheric Car-Brake Pipes; and I do hereby declare the following to be a full, clear, and exact description thereof, reference being had to the accompanying drawing making a part of this specification, in which—

Figure 1:
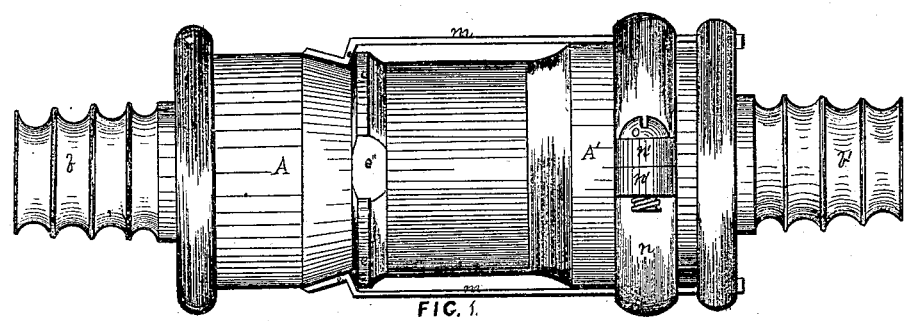
Figure 2:
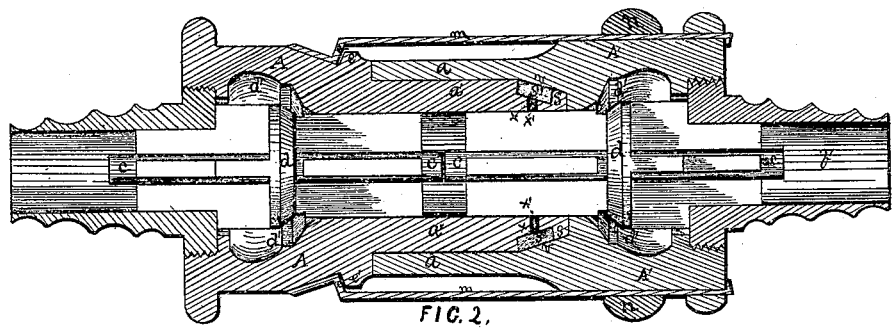
Figure 3:
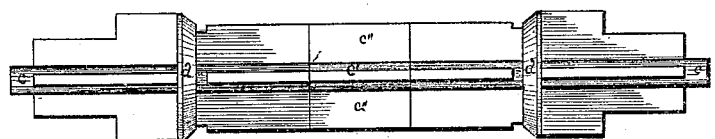

Figure 1 is an outside view of my improved coupling; Fig. 2 is a longitudinal section thereof; and Fig. 3 shows a modification in devices for unseating the valves.

Like letters of reference indicate like parts in each.

Among other requirements in couplings for the connecting-pipes of atmospheric brakes for railway cars the following are important: Ease in coupling and uncoupling the pipes; a union when they are coupled together sufficiently firm and secure to resist an ordinary strain, but still not so firm but that if a car leaves the track, or its coupling with the next car breaks, the pipe-coupling may also separate without injury or damage to any of the working parts; and, also, a joint between the coupling as nearly air-tight as possible. The object of my invention is to secure these ends.

To enable others skilled in the art to make and use my invention, I will proceed to describe its construction and mode of operation.

The male and female parts A A' are made of any suitable material, in any known way. In the outer ends of these are fastened the pipe $b$ $b'$, to form a connection with the flexible hose required for such purposes. The barrels $a$ of the female part and the pipe-end $a'$ of the male part are bored and turned to a uniform size, as near as may be consistent with ease of coupling. The forward end of the male pipe $a'$ is turned to a conical or taper form, as shown at $s$. A groove is cut in the conical face of this taper, and an India-rubber or other flexible elastic packing-ring, $s'$, is inserted therein, with its face flush or a little above the face of the conical part $s$. In the rear end of the barrel $a$ of the female part a conical seat, $v$, of like size and form as the end $s$, is bored out, so that when the couplings are together an air-tight joint will thereby be secured; but, as a modification of this form of packing, the pipe-end $a'$ and the barrel $a$ may be bored to a true cylindrical form, and the packing-ring be interposed between the end of the pipe $a'$ and the shoulder at the base of the barrel; or such packing-ring may be arranged in a groove cut in either. For convenience in removing or renewing the packing, and also to secure a better joint, I make air-holes $x$ from the inside of the pipe $a'$ through into a groove, $x'$, under the ring $s'$. The pressure of air produced by forcing the air back through the couplings will then be so great that the ring $s'$ will press with immense force against the face of the conical seat in the base of the barrel $a$. The valves $d$, as shown, are of the ordinary form of wing-valves, except that they have stems $c$, which project so far forward as to engage and unseat each other when the couplings are together. When they are thus unseated the body of each valve occupies about the middle of a chamber, $d'$, so enlarged as to allow the air to pass around the valve. Any form of valve will answer for the purpose described—as, for example, a flap-valve or a ball-valve—provided only the valve itself, or some stem or other device connected therewith, shall project far enough beyond its seat to engage the same or a similarly-operating device of the other valve. As this feature of my coupling is described in Letters Patent granted to me April 13, 1869, I make no claim to it herein. In connection with the springs $m$, also described in said Letters Patent, I use an adjustable clamping-ring, $n$, which embraces them tightly, and is fastened by a screw, $o$, passing through the outwardly-turned ends $n'$ of the ring $n$. By loosening this screw the ring $n$ may be slid forward or back, according to the degree of rigidity of the springs $m$, which sometimes varies, whereby the hooks $e$ on the ends of such springs are caused to engage the bead $e'$ with the degree of fixedness desired, and no more. For ease in coupling and uncoupling the pipes, which commonly has to be done by hand, I cut away the beads $e'$ at two opposite sides, as at $e''$; then, by rotating the coupling till the springs $m$ come opposite to such cut-away parts $e''$, the hooks $e$ are slipped on and off at pleasure, when, by a reverse rotating, they are brought to the position shown.

In Fig. 3 I have shown the valves $d$ without any stems $c$ for unseating them, as above described, but, in lieu thereof, have shown a separate interposed stem, $c'$, having guiding-wings $c''$, to guide it and hold it in its proper place in the pipe $a'$, in which it is to be arranged.

The pipe $a'$ may be chambered out, if so desired, or have an arrangement of stops or lugs to limit the length of motion of the separate stem $c'$, and to keep it in place when the pipes are uncoupled. It will readily be seen that in operation the valves $d$ will, when the couplings are joined as already described, come against the stem $c'$ and be thereby thrown back off their seats with like effect as above set forth.

The stem $c'$, instead of having wings $c''$, may be hung or otherwise arranged in the pipe $a$ so as to have a free longitudinal motion within the required limits, and so be held in place by guides or by its mode of attachment or arrangement that it shall engage the valves $d$ and unseat them when the pipes are coupled together; and such construction I claim, broadly, as a part of my invention.

The other features of operation are set forth in the Letters Patent above referred to.

What I claim as my invention, and desire to secure by Letters Patent, is—

1. The pipes $a$ $a'$, the latter having a packing-ring, $s'$, in its taper end, and the former a conical seat or recess at its base, arranged in connection with the ring $n$, springs $m$, and bead $e$, the latter having cut-away parts $e''$, substantially as described.

2. In combination with the valves of an atmospheric car-brake coupling, an interposed longitudinally-movable block or stem, whereby, when the couplings are united, the valves are unseated, substantially as described.

In testimony whereof I, the said GEORGE WESTINGHOUSE, Jr., have hereunto set my hand.

GEO. WESTINGHOUSE, Jr.

Witnesses:
  A. S. NICHOLSON,
  G. H. CHRISTY.